J. BLAIR, Jr.
TIRE TREAD.
APPLICATION FILED AUG. 28, 1917.

1,250,781. Patented Dec. 18, 1917.

WITNESSES

INVENTOR
John Blair Jr.
BY
ATTORNEYS

UNITED STATES PATENT OFFICE.

JOHN BLAIR, JR., OF ROCK SPRINGS, WYOMING.

TIRE-TREAD.

1,250,781.   Specification of Letters Patent.   Patented Dec. 18, 1917.

Original application filed March 7, 1917, Serial No. 152,988. Divided and this application filed August 28, 1917. Serial No. 188,638.

*To all whom it may concern:*

Be it known that I, JOHN BLAIR, Jr., a citizen of the United States, and a resident of Rock Springs, in the county of Sweet-water and State of Wyoming, have invented a new and Improved Tire-Tread, of which the following is a full, clear, and exact description.

My present application is a division of an application filed by me in the United States Patent Office on March 7, 1917, Serial No. 152,988 and relates to novel tread elements and means to mount the same on a tire. The tread is more particularly intended for application to a protective shell as shown in my aforenamed appliction.

Reference is to be had to the accompanying drawings.

Figure 1:
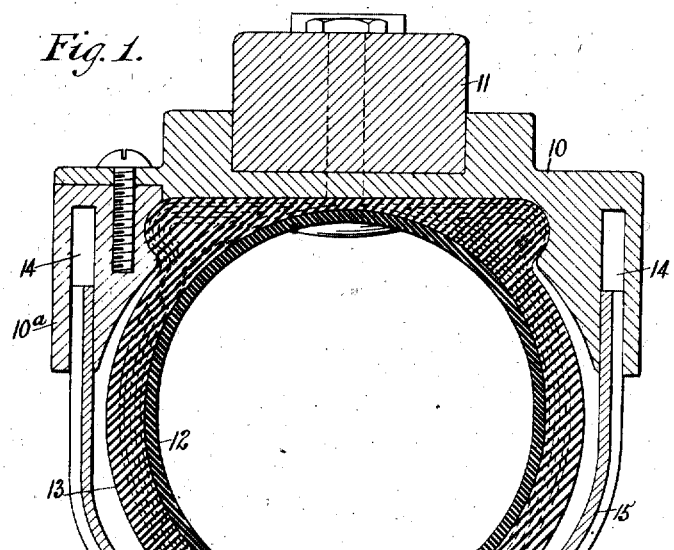
Figure 1 is a cross section of a tire equipped with my improved tread.
Figure 2:
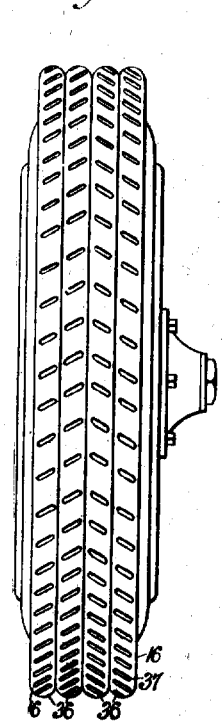
Fig. 2 is a face view of a wheel equipped with my improved tread.

The numeral 10 indicates a tire rim secured in any suitable manner to a wheel rim indicated at 11. The rim 10 is adapted to seat a tire of any approved form, there being illustrated an inner tube 12 and a casing 13. The rim 10 has annular side channels 14, one of which is formed in a detachable rim member 10ª and said channels receive the inner side edges of a protective shell 15, all of which parts are disclosed in my application above referred to.

Figure 4:
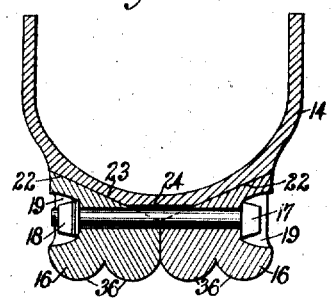
Fig. 4 is a cross section on a reduced scale taken through the shell and tread elements at a transverse securing bolt.

On the outer periphery of the shell 15, tread bands 16 of unbroken continuity are received and clamped in position by transverse bolts 17 and nuts 18. The bolt heads and the nuts are received in channels 19 in the sides of the tread bands, said channels serving to thus house and protect the bolt heads and the nuts and at the same time reducing the weight of the tread bands without impairing their strength, it being understood that the said bands and the floating shell are formed of steel in practice. At the inner periphery of each tread band 16, the same is beveled as indicated by the numeral 22 and the said beveled surfaces correspond with the cross section of the shell 15 which is V-shape to present oppositely beveled surfaces 23, the apex of the V being at the median line of the tire. Thus, the tightening of the nuts 18 will draw the tread bands 16 firmly to position by reason of the wedging action produced by the opposed surfaces 22, 23, on said bands and shell. As best seen in Fig. 4, the shell 24 at the apex of its V-shaped periphery has produced therein a transverse notch 24 which is positioned in register with or complementary to the transverse bolt holes 25 in the tread bands, whereby a positively interlocked engagement is effected between the bolts 17 and the shell 15 to thereby prevent creeping of the tread bands on the shell. The numeral 20 indicates a washer employed beneath each nut 18.

Figure 3:
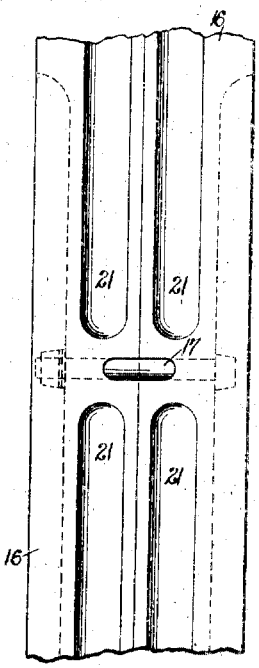
Fig. 3 is a fragmentary developed view showing the inner face of the supporting shell to which the tread elements are applied in practice.

Each tread band 16 is formed at the interior with a channel or recess 21, whereby each tread band presents separated parallel contact surfaces bearing respectively on the beveled surfaces 23 adjacent to the apex thereof and laterally outward from the apex to insure a solid bearing of the tread bands on the shell. The channeling of the tread bands furthermore makes them more responsive to the bolts 17 so that the tightening up of the nuts on the bolts will insure an effective lateral compression of the tire bands to tightly bind the same on the shell. It will be observed from Fig. 3 that the annular continuity of the channels 21 is broken at a bolt 17 so that solid tread band portions are presented to take the bolt or bolts.

The steel tread bands 16 lend themselves to production of a non-skidding formation thereon, for which purpose each band 16 is produced with annular beads 36, and in said bands oblique recesses or depressions 37 are produced.

Having thus described my invention, I claim as new, and desire to secure by Letters Patent:

In a tire attachment, a shell adapted to embrace a tire and formed V-shape at the periphery, the apex of the V-shape formation being outermost presenting convergent side surfaces, separate tread bands on said shell and beveled at the inner peripheries to correspond with the convergent surfaces of the shell, said bands being formed with channels at the interior, and transverse bolts connecting said tread bands and serving to draw the same tightly in place on the said shell, the continuity of said channels being broken at the bolts to present solid tread band portions to take said bolts.

JOHN BLAIR, Jr.